(12) United States Patent
Michel et al.

(10) Patent No.: US 8,406,921 B2
(45) Date of Patent: Mar. 26, 2013

(54) METHOD AND DEVICE FOR CONTROLLING A MANIPULATOR

(75) Inventors: Wolfgang Michel, Mittelneufnach (DE); Thomas Purrucker, Augsburg (DE); Rene Rossig, Augsburg (DE); Dietmar Tscharnuter, Friedberg (DE)

(73) Assignee: KUKA Roboter GmbH, Augsburg (DE)

( * ) Notice: Subject to any disclaimer, the term of this patent is extended or adjusted under 35 U.S.C. 154(b) by 399 days.

(21) Appl. No.: 12/825,571

(22) Filed: Jun. 29, 2010

(65) Prior Publication Data
US 2011/0010008 A1 Jan. 13, 2011

(30) Foreign Application Priority Data
Jul. 8, 2009 (DE) .................. 10 2009 032 278

(51) Int. Cl.
*G05B 19/18* (2006.01)
(52) U.S. Cl. ...................................... 700/250
(58) Field of Classification Search .............. 700/250
See application file for complete search history.

(56) References Cited

U.S. PATENT DOCUMENTS

| | | | |
|---|---|---|---|
| 5,129,044 A * | 7/1992 | Kashiwagi et al. | 700/251 |
| 5,566,247 A * | 10/1996 | Watanabe et al. | 382/155 |
| 6,295,484 B1 * | 9/2001 | Ojima et al. | 700/245 |
| 2004/0193293 A1 * | 9/2004 | Watanabe et al. | 700/56 |

FOREIGN PATENT DOCUMENTS

| | | |
|---|---|---|
| DE | 198 26 395 | 12/1999 |
| DE | 10150225 A1 | 4/2003 |
| EP | 1 464 453 A2 | 10/2004 |
| JP | 7-276273 | 10/1995 |
| JP | 2002-219674 | 8/2002 |
| JP | 2002-307344 | 10/2002 |
| WO | 03/095125 A2 | 11/2003 |

OTHER PUBLICATIONS

European Patent Office; Search Report in European Patent Application No. 10005820.5 dated Nov. 5, 2012; 3 pages.

* cited by examiner

*Primary Examiner* — James Trammell
*Assistant Examiner* — Michael D Lang
(74) *Attorney, Agent, or Firm* — Wood, Herron & Evans, LLP

(57) ABSTRACT

A method according to the invention for operating a manipulator, in particular a robot (1), includes the following steps:

Figure 1:
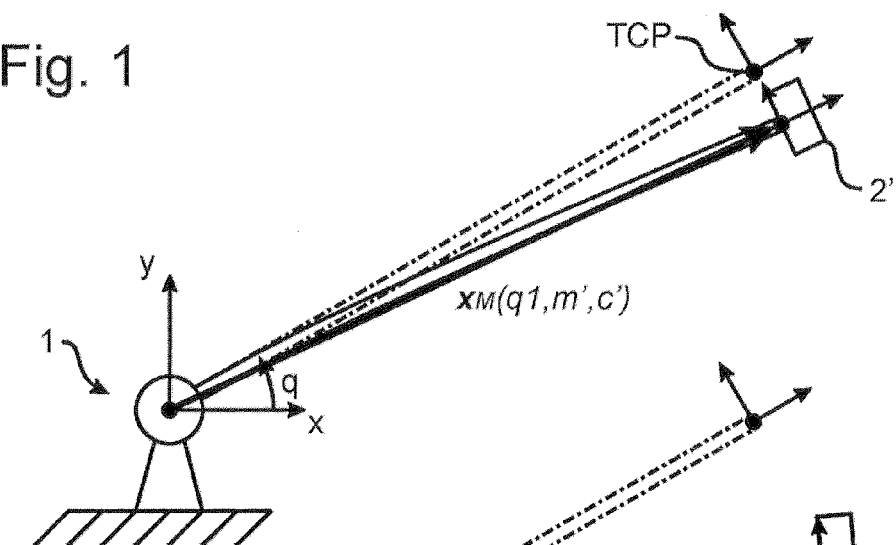

determining (S10) parameters (c', c") of an exactly positioned manipulator model (M) with various nominal loads (m', m");

specifying parameters (c) of the manipulator model on the basis of which the manipulator is operated, depending on a payload (m) of the manipulator (S20); and operating the manipulator on the basis of the manipulator model (S30, S40).

12 Claims, 2 Drawing Sheets

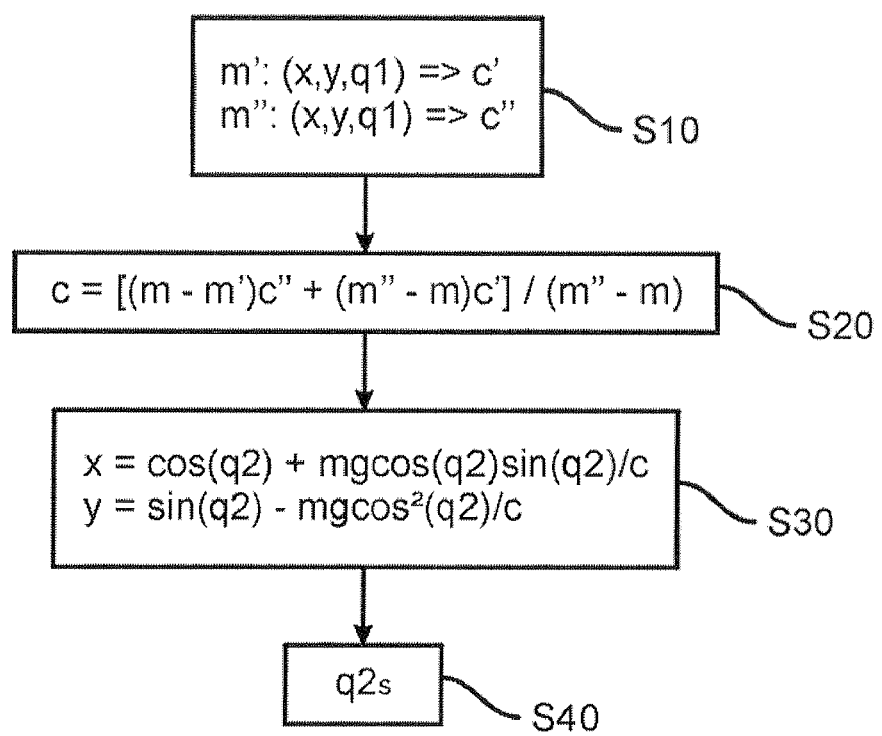

METHOD AND DEVICE FOR CONTROLLING A MANIPULATOR

The present invention relates to a method and an apparatus for operating a manipulator, in particular a robot, on the basis of a manipulator model.

A manipulator model describes in general the connection between joint coordinates q of the manipulator and the position x, for example the location and/or orientation, of a reference coordinate system that is fixed in relation to the manipulator, in particular a tool reference system ("tool center point" TCP):

$$M: q \mapsto x \qquad (1)$$

The position vector x here may contain for example Cartesian coordinates (x, y, z) and EULER or KARDAN angles ($\alpha$, $\beta$, $\gamma$) of the TCP in a basis system of the manipulator or its DENAVIT-HARTENBERG coordinates, the joint vector q the joint angles ($q_1, \ldots, q_n$) of the rotating joints or the angle positions of rotary drives of an articulated arm robot, the travel distances of linear drives or the like.

By solving the reverse kinematics described by the manipulator model, it is possible to determine for a desired target position $x_s$ of the reference coordinate system fixed in relation to the manipulator, in particular the corresponding joint coordinates $q_s$, to which a manipulator controller then moves in order to reach the target position with the manipulator:

$$M^{-1}(x_s) = q_s \qquad (2)$$

In singular poses, with redundant manipulators where dim(q)>dim($x_s$), when there are ambiguities such as elbows above or below, or for positions that are unreachable by the manipulator, additional conditions, for example optimality criteria, may be used to solve (2).

An ideal kinematic manipulator model that is defined only by theoretical kinematic parameters, in particular theoretical member lengths, axis deviations and the like, describes only absolutely rigid, zero-tolerance manipulators exactly. With real manipulators, however, the position also depends on additional parameters p, in particular rigidities of the members, joints and drives, masses and locations of centers of mass, gear free play and the like:

$$M(p): q \mapsto x \qquad (3)$$

DE 198 26 395 A1 therefore proposes an exactly positioned manipulator model. By determining the deviations between detected actual positions $x_{actual}$ and theoretical positions $x_M$ and adjusting the parameters of the model so that the deviations are minimized:

$$\left| \frac{M(q, p) - x_{ist}(q)}{x_M} \right| \to \text{Min}! \Rightarrow p \qquad (4)$$

it is possible to calibrate the exactly positioned manipulator model. If the joint coordinates $q_s$ corresponding to a target position $x_s$ are then determined according to this exactly positioned manipulator model, the real manipulator is able to move more exactly to the desired target position $x_s$ within the framework of the accuracy of the model and controls.

Up to now the parameters have been determined only with a particular payload moved by the manipulator, usually a standard or nominal load. But nonlinearities in particular cause a manipulator model with a set of parameters optimized for a particular nominal load to become inaccurate with payloads that deviate from that nominal load, so that the manipulator does not move to the desired position with the desired exactness.

EP 1 464 453 A2 therefore proposes that a correction vector $T(m_i, x_{s,j})$ be measured for different payloads $m_i = (m_i, r_{m,i})$ characterized by masses $m_i$ and center of mass positions $r_{m,i}$, for each of various target positions $x_{s,j}$. This correction vector describes the deviation between the theoretical positions $x_{kM}$ according to an ideal kinematic model and the registered actual positions $x_{actual}$ ($x_{ist}$):

$$T_{i,j}(m_i, x_{ist,j}) = x_{kM} - x_{ist} \qquad (5)$$

By adding the particular correction vector that is closest to the stored target position and the payload being moved to each stored target position $x_s$ of a target path that is to be traversed with a payload m, the deviations between the ideal kinematic model and the real manipulator are approximately compensated for.

A disadvantage is that discontinuities result when changing between the target positions of the correction vector, and thus changing so to speak the underlying model according to which the joint coordinates are determined. In particular, however, sufficiently fine discretization of the working space necessitates moving to a great many different locations and orientations with various payloads: For example, if a payload is described by four parameters, namely its mass m and the Cartesian components $x_m, y_m, z_m$ of its center of mass, the orientation by three coordinates, for example the KARDAN angles ($\alpha, \beta, \gamma$) of the TCP, and its location by three additional coordinates (x, y, z), and if these are quantified into n discrete values, then it is necessary to measure and store $$n_m \cdot n_{x_m} \cdot n_{y_m} \cdot n_{z_m} \cdot n_\alpha \cdot n_\beta \cdot n_\gamma \cdot n_x \cdot n_y \cdot n_z$$

correction vectors, from which the one that is closest to a stored target position must be determined in each case.

The object of the present invention is to improve the operation of a manipulator, in particular a robot.

The present invention proposes to determine one or more parameters of an exactly positioned manipulator model, in particular elasticities or rigidities of gears, joints or members, damping, in particular in drives, gears or structure damping, play such as gear or joint play, tolerances, geometric variables such as member lengths, axial distances, obliquities and the like, with two or more different nominal loads, and to specify parameters of the manipulator model depending on a payload of the manipulator.

In contrast to the known method of optimizing parameters for a single nominal load, this makes it possible in particular to take account of non-linearities in the parameters, and thus to work more exactly on the basis of a better-calculated model. This can be recognized from the example of a simple non-linear spring: If the rigidity of a spring is determined only on the basis of the deflection under a single nominal load, then the model, which in the case of a spring is reduced to Hooke's law of elasticity w=F/c, with deflection w, force F and (non-linear) rigidity c(w), yields incorrect deflections with other payloads.

In contrast to determining correction vectors for various nominal loads and poses, the same manipulator model can also be evaluated advantageously for various poses, including especially ones not previously measured, as soon as its parameters corresponding to the actual payload are defined. That makes it possible according to one aspect of the present invention to compensate better and with less effort for deviations, in particular for elastic deviations. By using the same model, it is possible in a preferred embodiment to avoid discontinuities like those caused by the discretization of the deviations registered in various poses. In a preferred refinement, the exactly positioned manipulator model can be a kinetic or dynamic model which takes account of kinetic or dynamic effects, in particular weights, inertial forces and/or gyroscopic forces.

With such a model, adapted according to the invention to the particular payload, the manipulator for example can be designed and optimized, in particular in terms of its hardware or software technology. In the same way, the manipulator model can also be used for path planning, for example by using offline-generated target positions of a reference system fixed in relation to the manipulator, such as the TCP, to determine the corresponding joint coordinates or the positions taken by the reference system fixed in relation to the manipulator while traversing a trajectory specified in joint coordinates. In particular, the model can also be used when controlling the manipulator, where controlling also refers in the present case to closed-loop feedback control, i.e., the specification of control variables on the basis of a comparison of target values with returned actual values. Use of the exactly positioned manipulator model in this and similar applications is referred to in general as operation of the manipulator.

Parameters of the manipulator model can be determined in particular by moving to one or preferably more poses, characterized for example by the joint coordinates, registering in each of these poses an actual position of a reference fixed in relation to the manipulator, for example optically, for example using distance sensors or one or more cameras, and comparing it with a position resulting from the joint coordinates according to the model. In particular by minimizing the deviations between the actual and model positions for one or more poses, it is possible in this way to determine parameters of the model corresponding to every nominal load.

In a preferred embodiment, parameters of the manipulator model which are the basis for operating the manipulator are predefined automatically, depending on a payload of the manipulator. The payload may be known for example from a process, for example when an industrial robot grasps various payloads in a predefined sequence. It is equally possible to have the user input the payload or identify it, in particular automatically. To this end the payload may be detected, for example on the basis of a marking such as a barcode on the basis of its contour, and assigned to previously known payloads. It may also be assigned to predefined payload classes, for example on the basis of its measured weight or its size. It is also possible to ascertain the inertial parameters of the payload, in particular its mass, the location of its center of mass and/or its inertial tensor, by moving the payload and registering the forces that are required and the moments that occur. The same also applies to components of the manipulator, for example the mass, location of center of mass and/or inertias of individual members.

Preferably, parameters of the manipulator model on the basis of which the manipulator is operated are specified on the basis of a payload of the manipulator while the manipulator is being operated. In particular in the case of the cyclical grasping of various payloads mentioned earlier, the model can thus be adapted to the particular payload being grasped, for example by specifying parameters of the manipulator model on the basis of which the manipulator is being operated depending on the particular payload. If the model is employed offline, for example in advance path planning or optimization, it can for the same reasons also be advantageous here to specify parameters of the manipulator model depending on different payloads of the manipulator.

If a payload of the manipulator does not correspond to any of the nominal loads for which the parameters of the model have been determined, then parameters of the manipulator model on the basis of which the manipulator is being operated can be interpolated for that payload from the parameters that were determined with various nominal loads. Interpolation refers here in particular to a linear interpolation from two or more adjacent values, but equally for example to choosing the parameters for the nominal load(s) that come(s) closest to the payload.

Figure 2:
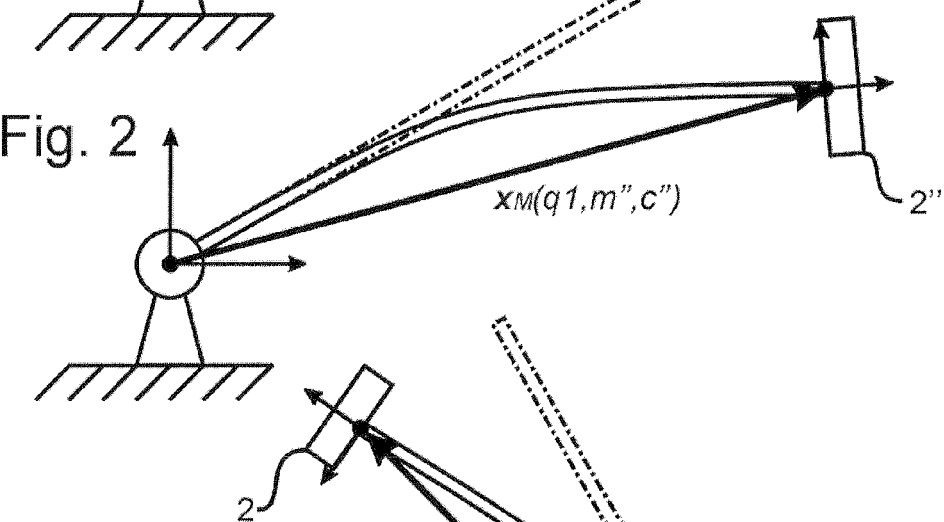
Figure 3:
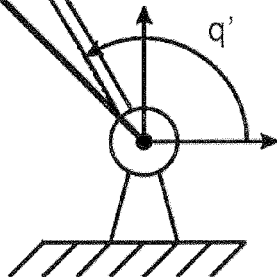

Additional advantages and features result from the subordinate claims and the exemplary embodiments. To this end the drawing shows the following, partially in schematic form:

FIG. 1: a single-arm robot during operation according to one embodiment of the present invention;

FIG. 2: the robot according to FIG. 1 with a different nominal load;

FIG. 3: the robot according to FIGS. 1, 2 with a payload in a different pose; and FIG. 4: the sequence of a method according to one embodiment of the present invention.

FIG. 1 shows in schematic representation a single-arm robot 1 having an arm rotatable around the joint angle 1, at whose end away from the joint a first nominal load 2' is situated at the TCP of the robot.

Dash-dotted lines sketch the pose that would be assumed by an absolutely rigid, zero-tolerance robot at a joint angle q1 and as it would be described by an ideal kinematic manipulator model.

With a real robot 1, however, the position x of the TCPs deviates due to elasticities in joint and arm, joint play, tolerances, etc. This is described by an exactly positioned manipulator model M, which in the present exemplary embodiment in simplified form with the formula $$M\left(\frac{c}{p}\right): \begin{pmatrix} \cos q + \dfrac{m \cdot g \cdot \cos q \sin q}{c} \\ \sin q - \dfrac{m \cdot g \cdot \cos^2 q}{c} \end{pmatrix} \mapsto \begin{pmatrix} x \\ y \\ \overline{x_M} \end{pmatrix} \quad (3')$$

only makes linear allowance for the deflection w=F/c at the end of the arm under the load F=mg cos(q). In order to determine the flexural rigidity c, in a step S10 (see FIG. 4) a known first nominal load 2' with mass m' is situated at the TCP, a pose q1 is assumed, in this pose the actual position $x_{actual}=(x_{TCP}, y_{TCP})$ of the TCP is registered and the parameter c' is determined so that the deviation between the registered actual positions and the theoretical positions according to the parameter-dependent exactly positioned model (3') is minimized.

It is clear from the example of a non-linear flexural rigidity that the same model M cannot be designed optimally for the entire operating range when the deviations are measured using only one nominal load 2'. In the exemplary embodiment, for example, the flexural rigidity is degressive: if instead of the nominal load 2' with the mass m' a different nominal load 2" with the same center of mass location but double the mass m" is situated at the TCP, the result is not double the deflection w"=2F/c=2 w', but rather for example a greater deflection, as can be seen in FIG. 2.

For that reason, according to the invention the parameter c of the exactly positioned manipulator model M is also determined for at least one additional nominal load 2" having a different mass m"=2m', by moving in step S10 to at least one, preferably the same pose q1, registering the actual position of the TCP in that pose and determining the parameter c" so that the deviation between the registered actual position and the theoretical position according to the parameter-dependent exactly positioned model is again minimized. The parameters c', c" are stored as functions of the nominal loads m' and m" respectively, for which they were determined (S10).

Now if robot 1 is to be operated, for example controlled, on the basis of the manipulator model, by the user specifying for example target positions $x_s$ of the TCP, determining the corresponding joint angles $q_s$ in a path plan and moving to them with a robot control, in a step S20 the parameter c of the manipulator model on the basis of which the manipulator is operated is first specified, depending on the payload 2 with the mass m. FIG. 4 indicates for this a linear interpolation of the flexural rigidity c for the mass m from the previously determined rigidities c', c" for m' and m" respectively.

With this parameter c, in step S30 the corresponding joint angles $q_s$ are determined and moved to (S40) on the basis of the exactly positioned manipulator model according to $$\left| \begin{pmatrix} \cos q + \dfrac{m \cdot g \cdot \cos q \sin q}{c} \\ \sin q - \dfrac{m \cdot g \cdot \cos^2 q}{c} \end{pmatrix} - \begin{pmatrix} x_s \\ y_s \end{pmatrix} \right| \to \text{Min!} \Rightarrow q_s \quad (2')$$

as indicated in FIG. 3.

In contrast to compensation for elastic deviations on the basis of an exactly positioned manipulator model whose parameters were calibrated for only one nominal load, the robot can be operated more exactly. The sequence of FIG. 1 through FIG. 3 also shows the advantage compared to a method using correction vectors, which must be determined in advance for various payloads and poses. In order to compensate for the deviations from the ideal kinematic model in all three operating cases (q1, m') (FIG. 1), (q1, m") (FIG. 2) and (q2, m) (FIG. 3), the robot must also be surveyed in advance in these configurations. If only the two measurements according to FIG. 1 and FIG. 2 are performed, in which there is a deviation downward and to the right, the extrapolation of the known correction vectors in the pose of FIG. 3 would also yield a deviation downward and to the right, and thus would result in a clearly false target joint angle $q2_s$. If instead, according to the invention, the parameter c is determined for various nominal loads and is specified in the model on the basis of the existing payload 2, then it is also possible on the basis of the exactly positioned manipulator model to move precisely to the pose according to FIG. 3, since the exactly positioned model yields a deviation downward and to the left in the pose according to FIG. 3.

REFERENCE LABELS 1 robot
2 payload
2', 2" nominal load
q joint angle
x position of the TCP of 1

The invention claimed is:

1. A method for operating a robot carrying a predetermined load using a dynamic model, comprising:
   determining a first set of parameters of the dynamic model based on a first nominal load;
   determining a second set of parameters of the dynamic model based on a second nominal load; and
   determining a third set of parameters of the dynamic model based on the first and second sets of parameters and based on the predetermined load;
   operating the robot based on the third set of parameters; and
   updating the third set of parameters based on kinetic and dynamic effects occurring during operation of the robot.

2. The method of claim 1, wherein the first and second sets of parameters include at least one of geometric variables, elasticity of robot components, damping of robot components, or free play of robot components.

3. The method of claim 1, wherein determining the first and second sets of parameters includes
   moving the robot to a selected position and orientation, and
   registering an actual position and an actual orientation of a reference associated with the robot in the selected position and orientation of the robot.

4. The method of claim 1, further comprising:
   automatically generating the third set of parameters in response to the predetermined load.

5. The method of claim 4, wherein automatically generating the third set of parameters includes generating the third set of parameters during movement of the robot.

6. The method of claim 1, further comprising:
   automatically determining the predetermined load.

7. The method of claim 1, further comprising:
   replacing the predetermined load with a second predetermined load; and automatically changing the third set of parameters based on the second predetermined load.

8. The method of claim 1, wherein determining the third set of parameters includes interpolating the first and second sets of parameters.

9. A robot comprising:
   a robot having a robot arm configured to carry a predetermined load;
   a controller operatively coupled to the robot for operating the robot when the robot arm is carrying the predetermined load, the controller being configured to store therein a dynamic model for operating the robot with the robot arm carrying the predetermined load, store therein a first set of parameters for operating the robot, the first set of parameters being based on a first nominal load, store therein a second set of parameters for operating the robot, the second set of parameters being based on a second nominal load, operate the robot based on the first and second sets of parameters and on a third set of parameters associated with the predetermined load, and
   update the third set of parameters based on kinetic and dynamic effects occurring during operation of the robot.

10. The robot of claim 9, further comprising:
    at least one of a sensor or a camera configured to obtain information on an actual position of the robot arm carrying the load and to generate a signal to the controller based on the obtained information.

11. The robot of claim 9, wherein the robot includes a plurality of gears, the controller being configured to determine the first and second sets of parameters based on free play associated with movement of the gears relative to one another.

12. The robot of claim 9, wherein the robot includes a plurality of components, the controller being configured to determine the first and second sets of parameters based on damping, elasticity, or rigidity of play associated with those components.

* * * * *